United States Patent [19]
Tateishi et al.

[11] Patent Number: 5,719,847
[45] Date of Patent: Feb. 17, 1998

[54] OPTICAL DISK PLAYER HAVING WAVEFORM DISTORTION COMPENSATING FUNCTION

[75] Inventors: Kiyoshi Tateishi; Kaoru Yamamoto; Hideki Hayashi; Masaru Umezawa, all of Tsurugashima, Japan

[73] Assignee: Pioneer Electronic Corporation, Tokyo, Japan

[21] Appl. No.: 584,219

[22] Filed: Jan. 4, 1996

[30] Foreign Application Priority Data

Jan. 17, 1995 [JP] Japan ................................ 7-005268

[51] Int. Cl.$^6$ .................................................. G11B 7/00
[52] U.S. Cl. ..................... 369/124; 369/54; 369/44.32
[58] Field of Search ........................... 369/44.32, 44.34, 369/44.35, 44.36, 54, 124

[56] References Cited

U.S. PATENT DOCUMENTS

| 5,442,615 | 8/1995 | Ohsato et al. | 369/44.32 |
| 5,546,367 | 8/1996 | Yoshimura et al. | 369/44.32 |

*Primary Examiner*—Thang V. Tran
*Attorney, Agent, or Firm*—Finnegan, Henderson, Farabow, Garrett & Dunner, L.L.P.

[57] ABSTRACT

An optical disk player for compensating a waveform distortion of a read signal which is caused due to a skew in the track tangential direction of an optical disk. An optical disk is constructed in a manner such that a skew amount of the irradiated portion of a recording surface of the optical disk for a light beam irradiated onto the recording surface of the optical disk is detected from the pickup and transmitting characteristics of a read signal generated from the pickup are controlled in accordance with the detected skew amount. A waveform distortion of the read signal due to a warp or distortion existing in the track tangential direction of the optical disk can be compensated and the recording data can be accurately reproduced.

5 Claims, 10 Drawing Sheets

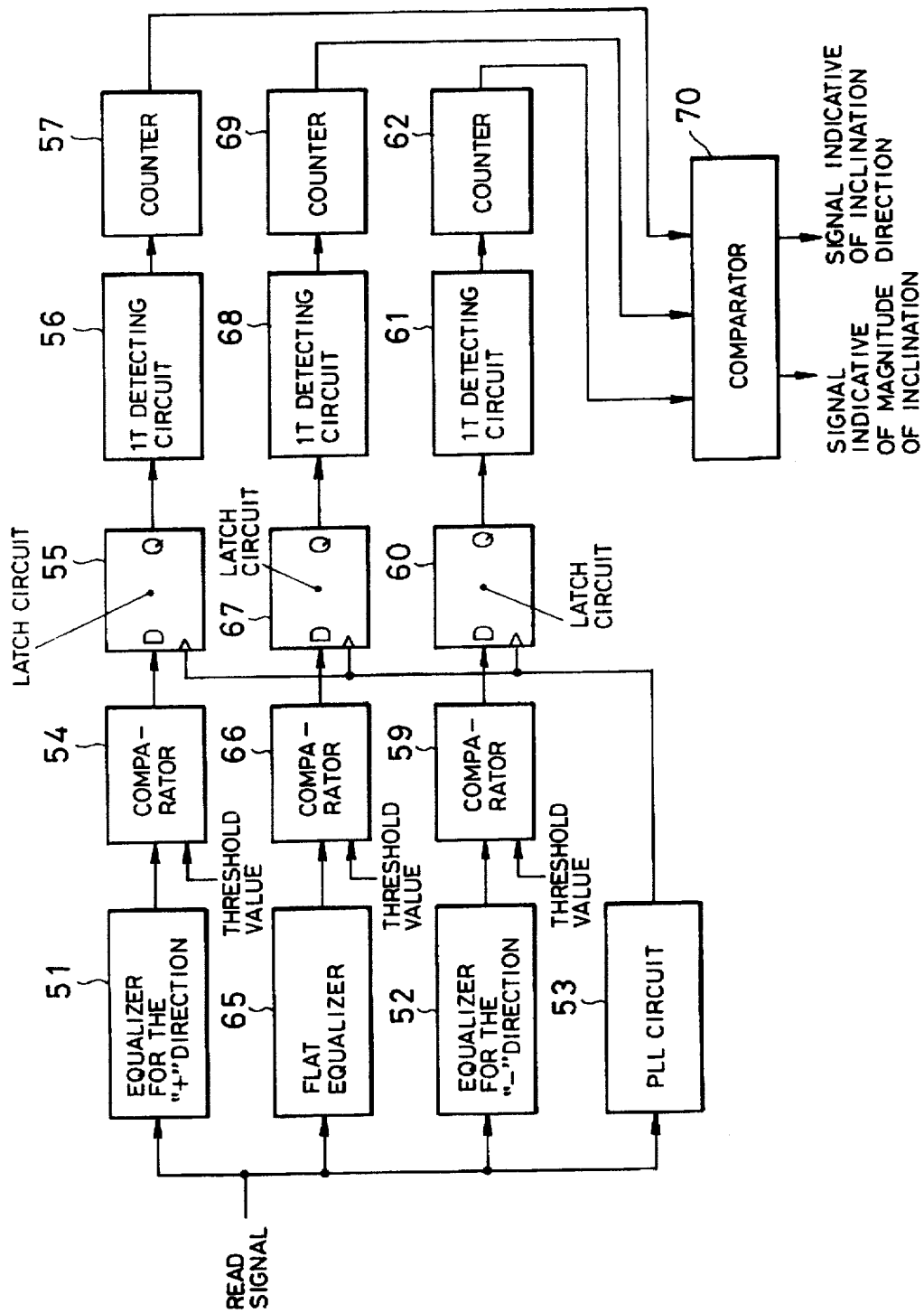

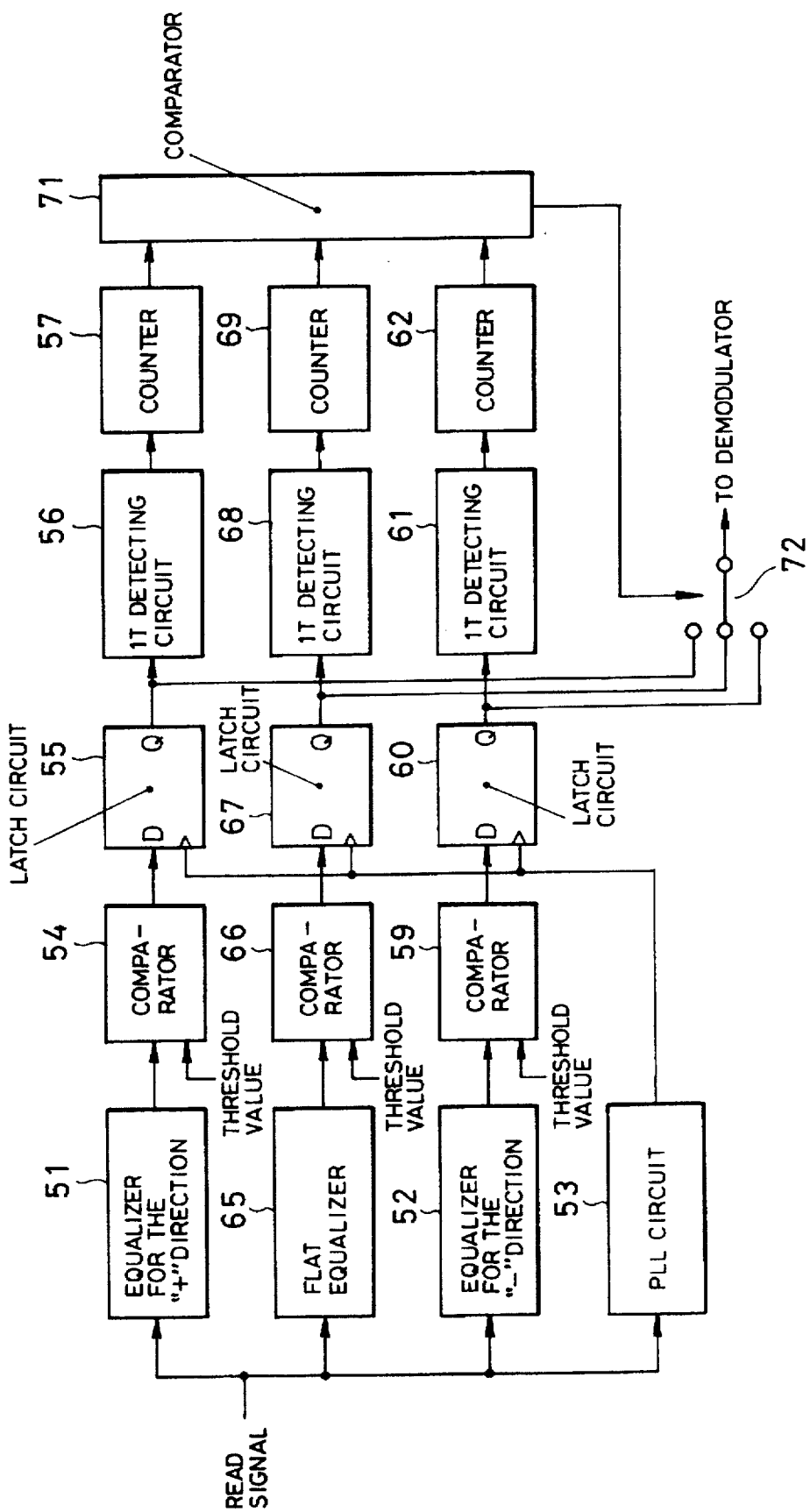

5,719,847

OPTICAL DISK PLAYER HAVING WAVEFORM DISTORTION COMPENSATING FUNCTION

BACKGROUND OF THE INVENTION

1. Field of the Invention

The present invention relates to an optical disk player devised to compensate a waveform distortion of a read signal due to a skew against a reading surface when data is read out from an optical disk.

2. Description of Background Information

In order to correctly read out recording data from a disc-like optical disk on which digital data is recorded in the form of a train of pits, it is necessary to converge a reading light beam which is irradiated on the disk accurately onto a pit. For this purpose, various kinds of servo controls such as focusing servo, tracking servo, tilt servo, and the like are provided for an optical disk player. The beam is focused onto a pit surface by the focusing servo, a beam spot is located by the tracking servo onto a track in which the pit train was formed, and the beam enters perpendicularly to the disk surface by the tilt servo and is reflected.

Although the tilt servo is effective for an inclination in the disk radial direction, it is not effective for an inclination in the track tangential direction of the disk. Because of a slow response speed of the servo, the tilt servo is only effective for a gentle change in inclination angle from an inner periphery to an outer periphery of the recording area of the disk. This means that the tilt servo is not effective for a rapid change in inclination angle within one rotation of the disk.

When the beam is irradiated with an inclination (skew) for the disk surface, a wave front aberration containing a coma-aberration as a main component increases and a distortion occurs in a waveform of a read signal. In the optical disk player on which the digital data has been recorded, an error ratio of the data reading increases because of the waveform distortion, so that it becomes a factor which inhibits recording at a high density and reproducing at a high reliability.

OBJECT AND SUMMARY OF THE INVENTION

It is, therefore, an object of the invention to provide an optical disk player having a function to compensate a waveform distortion of a read signal which occurs due to an inclination in the track tangential direction of an optical disk.

According to the invention, there is provided an optical disk player for reading and reproducing data recorded on an optical disk, which comprises: pickup means for irradiating a light beam onto a recording surface of the optical disk, for receiving its reflected light, and for generating a read signal in accordance with a light reception amount; skew detecting means for detecting a skew amount of an irradiated portion of the recording surface of the optical disk for the light beam; and equalizing means for controlling transmitting characteristics of the read signal in accordance with the skew amount detected by the skew detecting means.

According to the invention, the skew amount of the irradiated portion on the recording surface of the optical disk for the light beam irradiated from the pickup means onto the recording surface of the optical disk is detected and the transmitting characteristics of the read signal generated from the pickup means is controlled in accordance with the detected skew amount.

BRIEF DESCRIPTION OF THE DRAWINGS

FIG. 13 is a block diagram showing another construction of a skew detector; and

FIG. 14 is a diagram showing another embodiment of the invention.

DETAILED DESCRIPTION OF THE PREFERRED EMBODIMENTS

Embodiments of the invention will now be described in detail hereinbelow with reference to the drawings.

Figure 1:
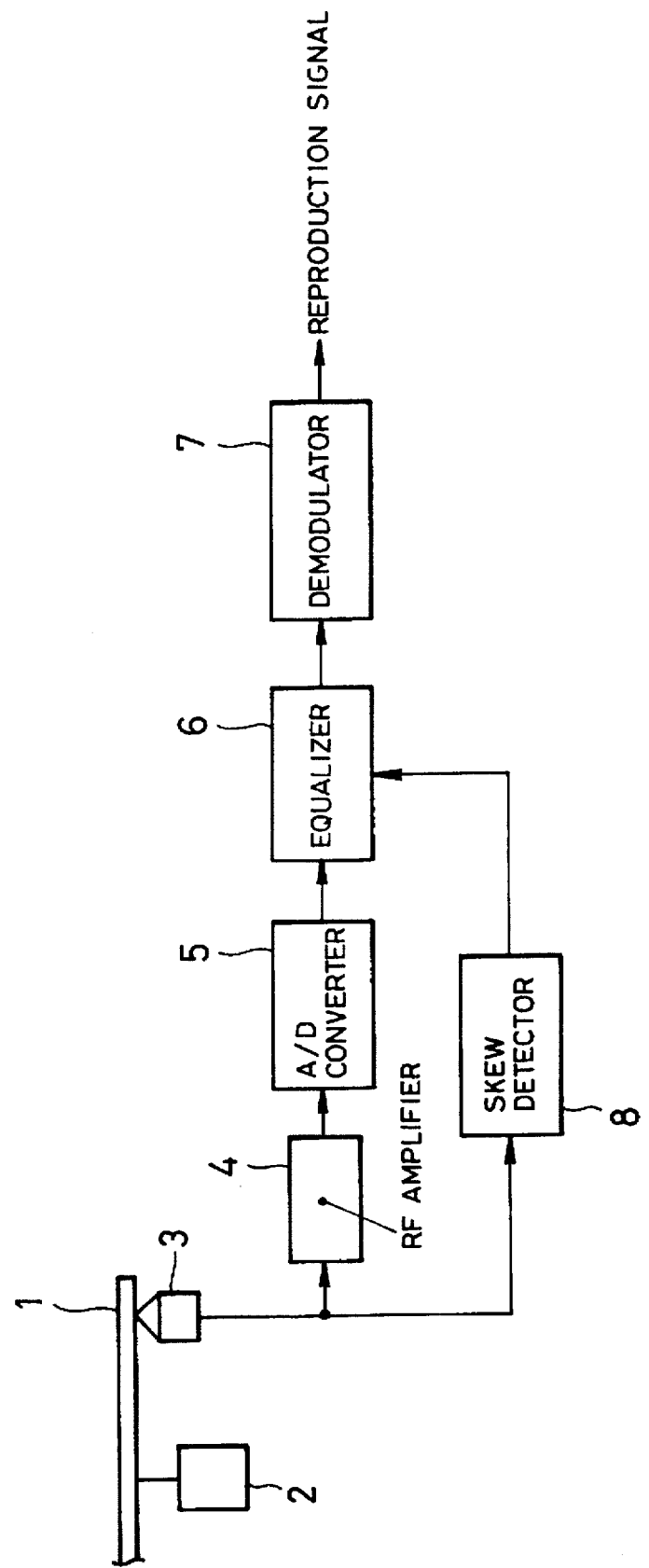
FIG. 1 is a block diagram showing an embodiment of the invention.

FIG. 1 shows an optical disk player as an embodiment of the invention. Digital data is recorded as a pit train along a spiral or concentric track onto a disc-like optical disk 1 set in the optical disk player. The optical disk 1 is rotated by a spindle motor 2 and the digital data recorded on the optical disk 1 is optically read out by a pickup 3. A read signal serving as an RF signal which is generated from the pickup 3 is an analog signal indicative of a light reception amount of a reflected light from the optical disk 1 due to a light beam irradiated by the pickup 3. The signal is amplified by an RF amplifier 4 and, after that, the amplified signal is digitized by an A/D converter 5. The digitized read signal is supplied to an equalizer 6. The equalizer 6 adjusts a phase and an amplitude of the read signal and generates the resultant signal to a demodulator 7. Phase characteristics and amplitude characteristics of the equalizer 6 are controlled in accordance with an output signal of a skew detector 8.

The rotation of the spindle motor 2 is feedback controlled in accordance with a servo signal included in the read signal in a servo circuit (not shown).

Figure 2:
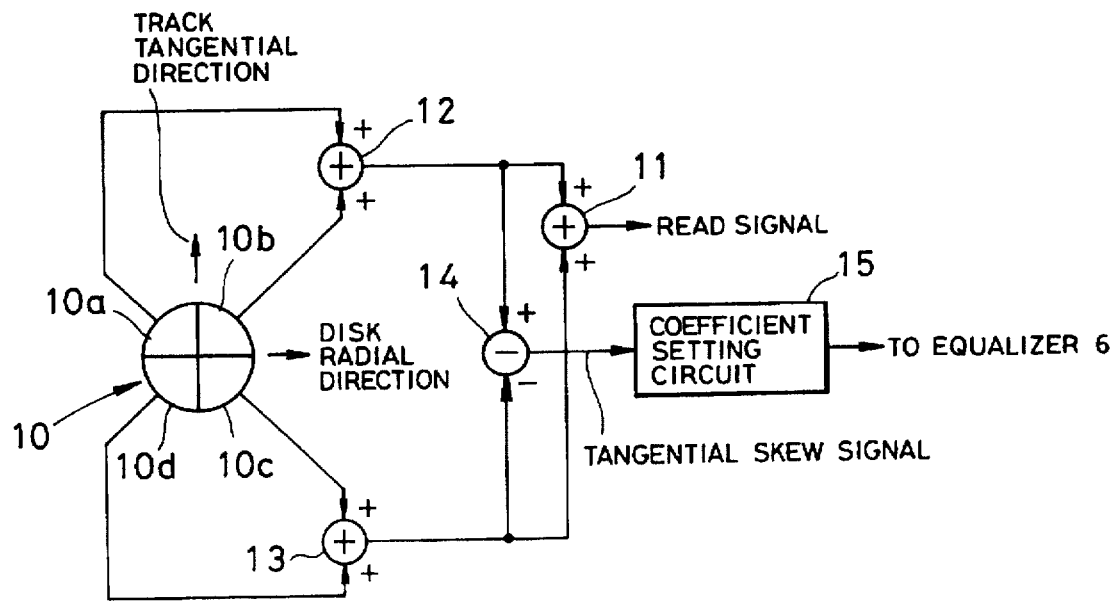
FIG. 2 is a diagram showing a specific construction of a skew detector.

A photodetector 10 of the pickup 3 comprises four photosensitive devices 10a to 10d which together constitute a circular light receiving surface as shown in FIG. 2. The light receiving surface of the photosensitive devices 10a to 10d is divided into four equal portions. The dividing directions correspond to a disk radial direction and a track tangential direction. The light receiving surfaces of the photosensitive devices 10a and 10b among the photosensitive devices 10a to 10d are located in front of the reading position. The light receiving surfaces of the photosensitive devices 10c and 10d are located behind the reading position. Namely, the light receiving surfaces are arranged so that the reading position of each pit on the track passes from the sides of the photosensitive devices 10a and 10b to the side of the photosensitive devices 10c and 10d by the rotation of the optical disk 1.

An adder 12 is connected to outputs of the photosensitive devices 10a and 10b. An adder 13 is connected to outputs of the photosensitive devices 10c and 10d. The adder 12 adds the output signal of the photosensitive device 10a and the output signal of the photosensitive device 10b. The adder 13 adds the output signals of the photosensitive devices 10c and 10d. The output signal of the adder 13 is subtracted from the output signal of the adder 12 by a subtracter 14. An output signal of the subtracter 14 is a tangential skew signal. After the output signals of the adders 12 and 13 were added by an adder 11, the resultant signal is supplied to the RF amplifier 4 as a read signal as mentioned above.

Although not shown, a signal obtained by subtracting a sum signal of the output signals of the photosensitive devices 10b and 10d from a sum signal of the output signals of the photosensitive devices 10a and 10c is a focusing error signal and a signal obtained by subtracting a sum signal of the output signals of the photosensitive devices 10a and 10d from a sum signal of the photosensitive devices 10b and 10c is a tracking error signal. It will be obviously understood that, further, if the tangential skew signal is merely obtained, it is sufficient to divide the light receiving surface into two surfaces in the disk radial direction.

Figure 3:
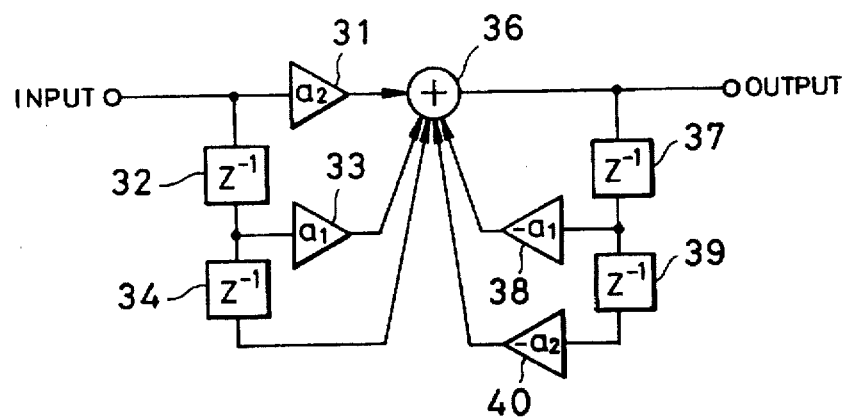
FIG. 3 is a diagram showing a secondary digital filter as a specific construction of an equalizer.

The equalizer 6 comprises a full band pass filter, specifically speaking, for example, a digital filter of the IIR type as shown in FIG. 3. Namely, in the digital filter, a coefficient multiplier 31 and a delay element 32 are connected to an input terminal to which the read signal is supplied. A coefficient multiplier 33 and a delay element 34 are connected to an output of the delay element 32. Outputs of the coefficient multipliers 31 and 33 and the delay element 34 are connected to an adder 36. A delay element 37 is connected to an output of the adder 36. A coefficient multiplier 38 and a delay element 39 are connected to an output of the delay element 37. A coefficient multiplier 40 is further connected to an output of the delay element 39. Outputs of the coefficient multipliers 38 and 40 are also connected to the adder 36.

A delay time of each of the delay elements 32, 34, 37, and 39 corresponds to one sampling period (1T). Data which is supplied to the multiplier 33 is data of one sample before the data which is supplied to the multiplier 31. Data which is supplied to the adder 36 through the delay element 34 is data of two samples before the data which is supplied to the multiplier 31. The same also applys to the multipliers 38 and 40. Multiplication coefficients of the multipliers 33, 31, 38, and 40 are set to $a_1$, $a_2$, $-a_1$, and $-a_2$, respectively.

Figure 4:
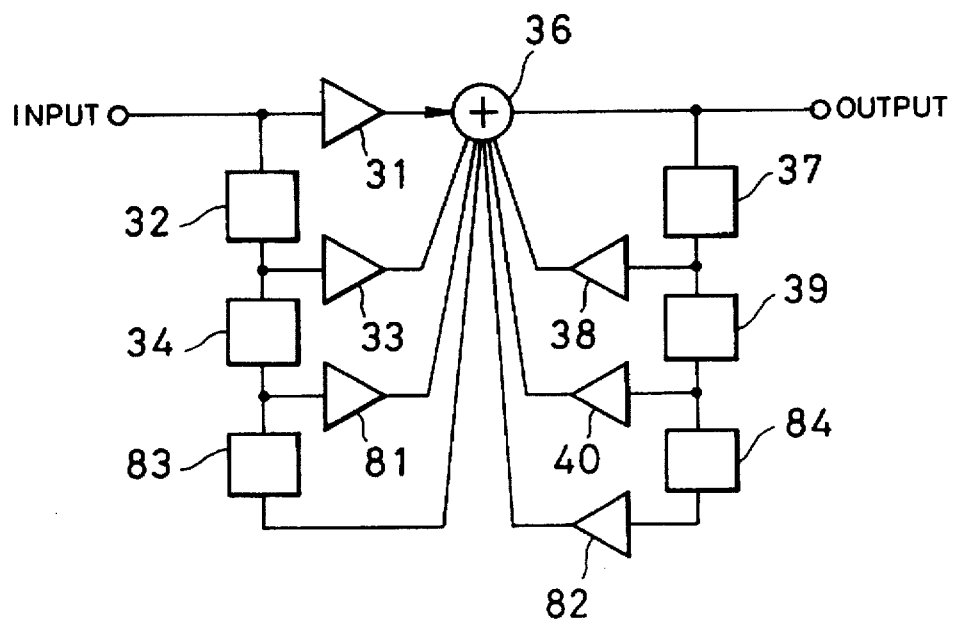
FIG. 4 is a diagram showing a tertiary digital filter as a specific construction of an equalizer.

Although the digital filter is a secondary filter, it can be also constructed as a tertiary digital filter by further adding multipliers 81 and 82 and delay elements 83 and 84 as shown in FIG. 4. When a transfer function H(z) of an Nth-order digital filter is given as follows by using a unit delay operator $z^{-1}$.

$$H(z) = \frac{z^{-N} + a_1 z^{-N+1} + a_2 z^{-N+2} + \ldots + a_N}{1 + a_1 z^{-1} + a_2 z^{-1} + \ldots + a_N z^{-N}}$$

The coefficients $a_1$ and $a_2$ of the multipliers 31, 33, 38, and 40 are set in accordance with the tangential skew signal. In order to set the coefficients, a coefficient setting circuit 15 is provided. The coefficient setting circuit 15 comprises, for example, a microcomputer and has a memory such as an ROM or the like in which the coefficients $a_1$ and $a_2$ corresponding to the tangential skew signals which can be detected have previously been stored. The circuit 15 retrieves the coefficients $a_1$ and $a_2$ corresponding to the tangential skew signals which are actually supplied, thereby allocating the coefficients to the multipliers 31, 33, 38, and 40 of the equalizer 6.

In the equalizer 6, two digital filters as shown in FIG. 3 are serially connected and one digital filter can be used to adjust amplitude characteristics and the other can be used to adjust phase characteristics. By using a DSP (digital signal processor), the digital filter as mentioned above can be also constructed by a digital signal process.

Figure 5:
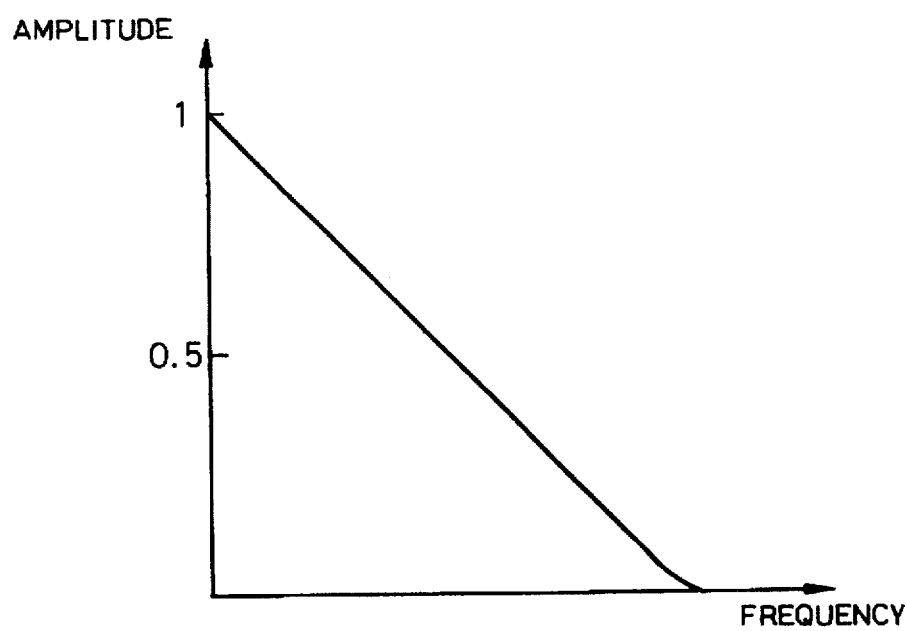
FIG. 5 is a diagram showing amplitude characteristics of a read signal in the case where there is no skew.
Figure 6:
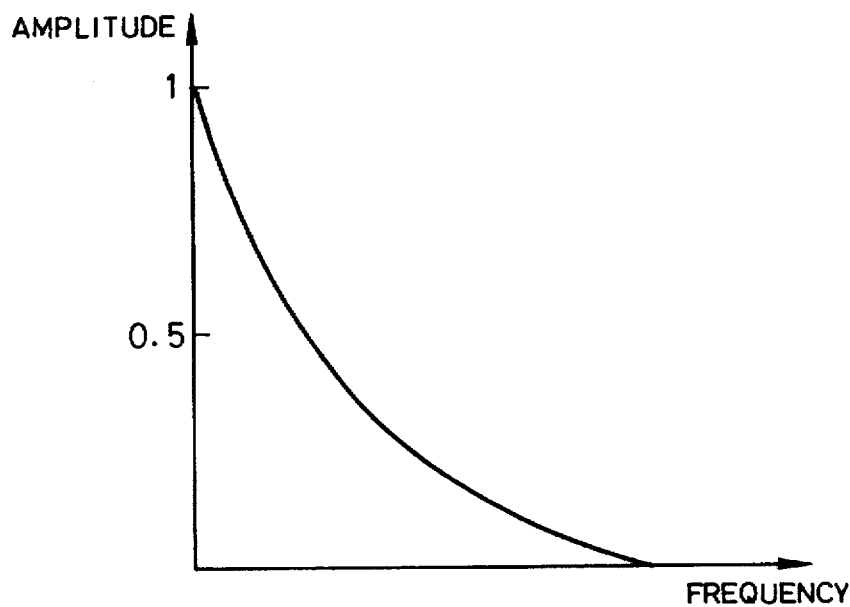
FIG. 6 is a diagram showing the amplitude characteristics of the read signal in the case where there is a skew in the "−" direction.
Figure 7:
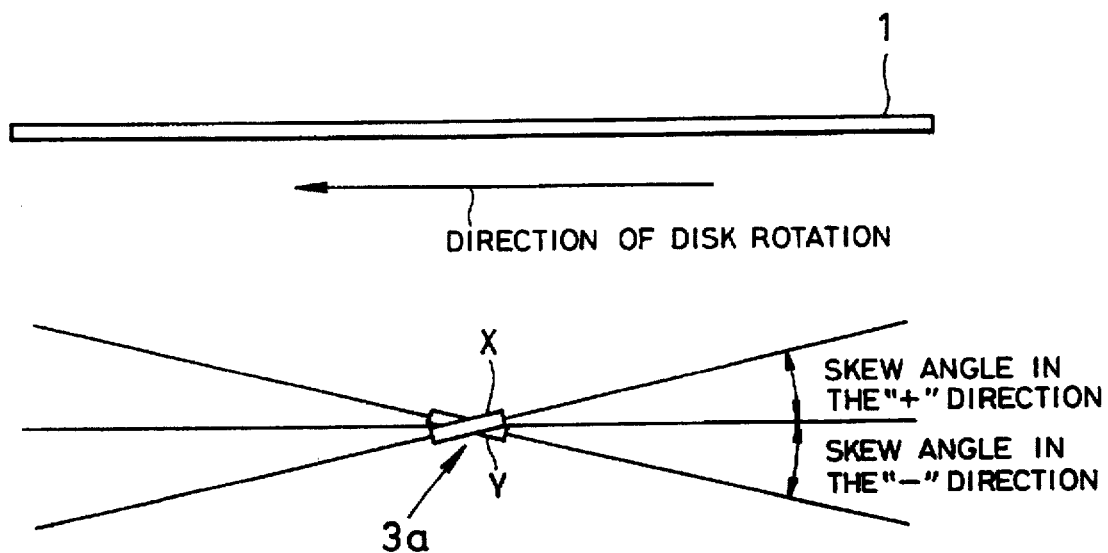
FIG. 7 is a diagram showing a skew in the "+" direction and a skew in the "−" direction by using the relation between a disk and an objective lens of a pickup.

In the case where there is a skew in the disk radial direction of the optical disk 1, the amplitude characteristics of the read signal generated from the pickup are changed. When there is a skew in the track tangential direction, however, the phase characteristics are changed in association with the amplitude characteristics of the read signal. FIG. 5 shows the amplitude characteristics of the read signal in the case where there is no skew. FIG. 6 shows the amplitude characteristics in the case where there is a skew in the "−" (minus) direction. The characteristics in the case where there is a skew in the "+" (plus) direction are the same as those in the case where there is a skew in the "−" direction. As mentioned above, when there is a skew, an amplitude level of the read signal decreases irrespective of the direction of the skew. The skew in the "+" direction and the skew in the "−" direction denote states as shown in FIG. 7. That is, when an objective lens 3a in the pickup 3 is inclined for the optical disk 1 as shown by X, the skew in the "+" direction occurs. When the objective lens 3a in the pickup 3 is inclined as shown by Y, the skew in the "−" direction occurs.

Figure 8:
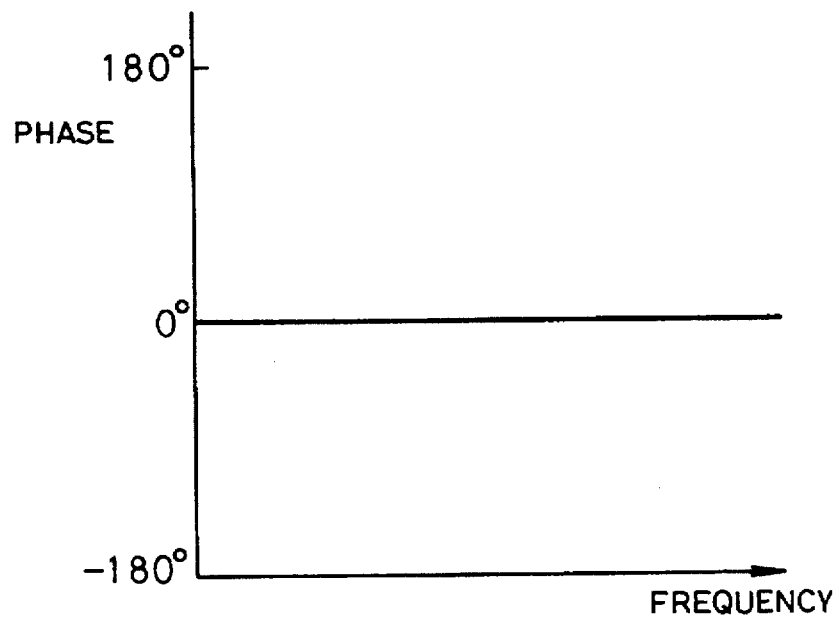
FIG. 8 is a diagram showing phase characteristics of the read signal in the case where there is no skew.
Figure 9:
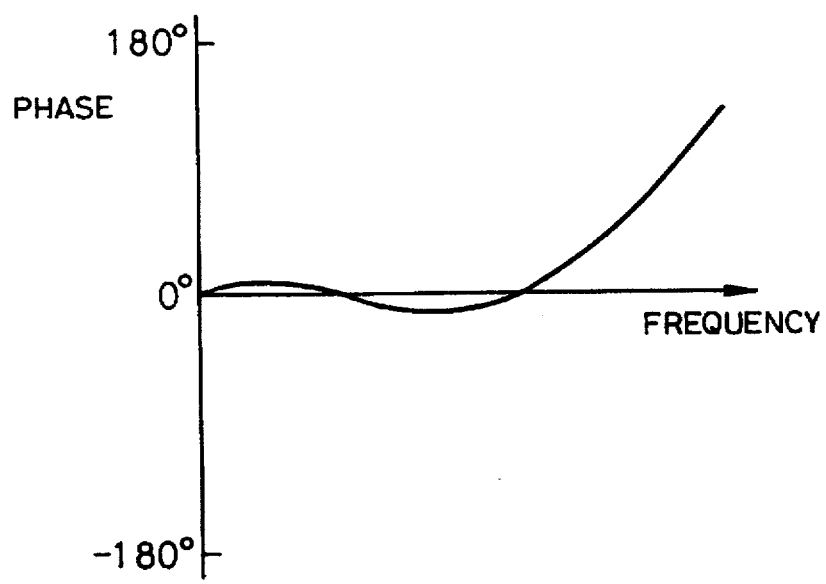
FIG. 9 is a diagram showing phase characteristics of the read signal in the case there is a skew in the "−" direction.
Figure 10:
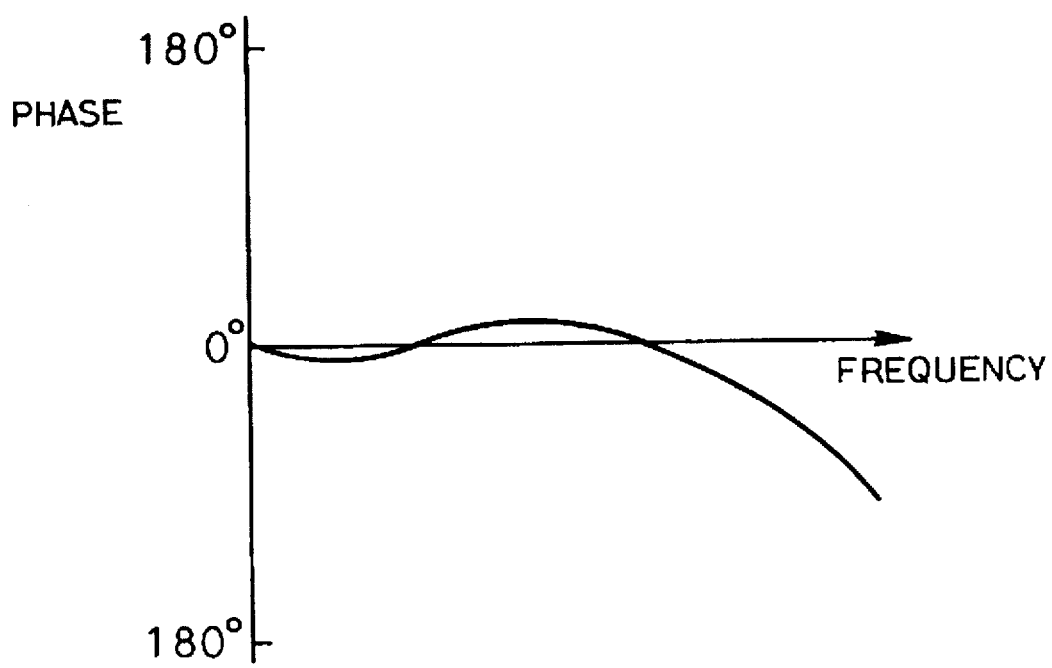
FIG. 10 is a diagram showing the phase characteristics of the read signal in the case where there is a skew in the "+" direction.

FIG. 8 shows the phase characteristics of the read signal in the case where there is no skew. FIG. 9 shows the phase characteristics of the read signal in the case where there is a skew in the "−" direction. FIG. 10 shows the phase characteristics of the read signal in the case where there is a skew in the "+" direction. As mentioned above, the phase characteristics are opposite in accordance with the inclining direction of the skew.

When there is a skew in the track tangential direction of the optical disk 1, since the tangential skew signal which is obtained from the subtracter 14 of the skew detector indicates the direction of the skew together with its magnitude, the coefficient setting circuit 15 sets the coefficients $a_1$ and $a_2$ in accordance with the tangential skew signal so as to correct change amounts of the amplitude characteristics and phase characteristics as transmitting characteristics of the read signal. Since amplitude correcting characteristics and phase correcting characteristics of the equalizer 6 are determined by the setting of the coefficients of the coefficient setting circuit 15, therefore, the amplitude and phase of the read signal are compensated by the equalizer 6.

Figure 11:
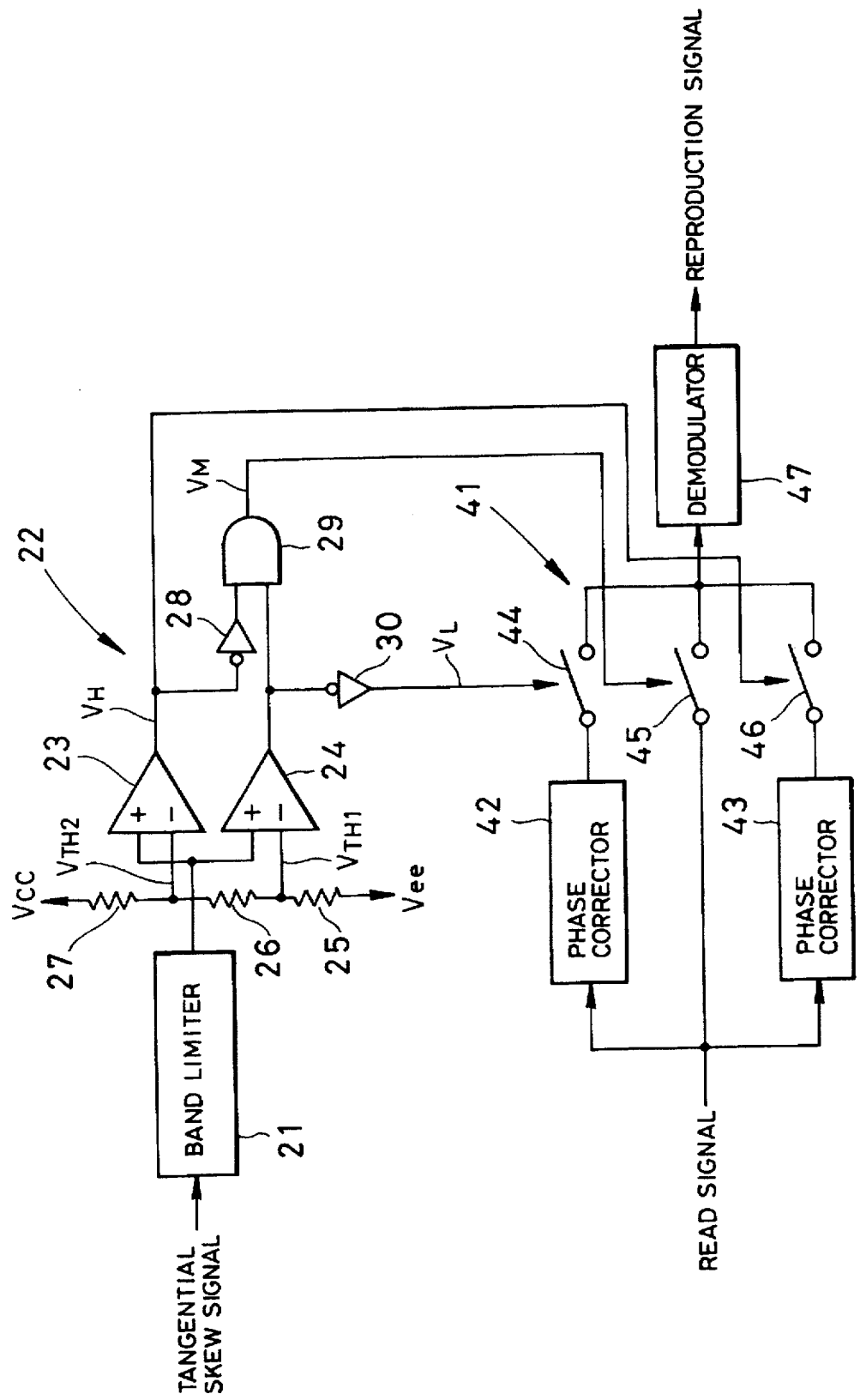
FIG. 11 is a diagram showing another embodiment of the invention.

FIG. 11 shows another embodiment of the invention. In the embodiment, the tangential skew signal is supplied to a window comparator 22 through a band limiter 21 comprising a low pass filter (LPF) or a band pass filter (BPF). The window comparator 22 is constructed by two comparators 23 and 24 and a referential voltage generating circuit comprising three resistors 25 to 27 which are serially connected. A voltage Vee is applied to one end on the resistor 25 side of both ends of the serially connected resistors 25 to 27. A voltage Vcc is applied to one end on the resistor 27 side. A first reference voltage $V_{TH1}$ is obtained from a node of the resistors 25 and 26. A second reference voltage $V_{TH2}$ is obtained from a node of the resistors 26 and 27. The first reference voltage $V_{TH1}$ is lower than the second reference voltage $V_{TH2}$. When the tangential skew signal transmitted through the band limiter 21 is larger than the second reference voltage $V_{TH2}$, the comparator 23 generates a high level signal. When the tangential skew signal is equal to or less than the second reference voltage $V_{TH2}$, the comparator 23 generates a low level signal. When the tangential skew signal transmitted through the band limiter 21 is larger than the first reference voltage $V_{TH1}$, the comparator 24 generates a high level signal. When the tangential skew signal is equal to or less than the first reference voltage $V_{TH1}$. The comparator 24 generates a low level signal. An output of the comparator 23 is connected to one input of an AND circuit 29 through an inverter 28. An output of the comparator 24 is connected to an inverter 30 together with another input of the AND circuit 29. Output signals $V_H$, $V_M$, and $V_L$ of the comparator 23, AND circuit 29, and inverter 30 become output signals of the window comparator 22.

The output signal of the window comparator 22 is supplied to an equalizer 41. The read signal from the pickup is supplied to the equalizer 41 through the RF amplifier. Two phase correctors 42 and 43 to which the read signal is supplied and three switches 44 to 46 are provided for the equalizer 41. The phase correctors 42 and 43 have different phase correcting characteristics. For example, the phase corrector 42 has the characteristics for correcting the phase of the read signal in the case where there is a skew in the "−" direction shown in FIG. 9. The phase corrector 43 has the characteristics for correcting the phase of the read signal in the case where there is a skew in the "+" direction shown in FIG. 10. The switch 44 is connected to an output of the phase corrector 42 and is turned on in accordance with the output signal $V_L$ of the inverter 30. When the switch 44 is turned on, the switch 44 relays the read signal whose phase was corrected by the phase corrector 42 to a demodulator 47. The switch 45 is directly connected to an input of the equalizer 41 and is turned on in accordance with the output signal $V_M$ of the AND circuit 29. When the switch 45 is turned on, the switch 45 directly relays the read signal supplied from the RF amplifier to the demodulator 47. The switch 46 is connected to an output of the phase corrector 43 and is turned on in accordance with the output signal $V_H$ of the comparator 23. When the switch 46 is turned on, the switch 46 relays the read signal whose phase was corrected by the phase corrector 43 to the demodulator 47.

In the construction, the tangential skew signal which is supplied to the band limiter 21 is obtained in the construction shown in FIG. 2. Assuming that a level of the tangential skew signal transmitted through the band limiter 21 is set to Vi, when $Vi<V_{TH1}$, each of the comparators 23 and 24 generates an output at the low level, so that the output signal $V_L$ of the inverter 30 is set to the high level. Both of the output signals $V_H$ and $V_M$ are set to the low level. The switch 44 is turned on by the high level of the output signal $V_L$. The read signal whose phase was corrected by the phase corrector 42 is, therefore, supplied to the demodulator 47. As for the level Vi of the tangential skew signal, when $V_{TH1}<Vi<V_{TH2}$, since the comparator 23 generates an output at the low level and the comparator 24 generates an output at the high level, the output signal $V_M$ of the AND circuit 29 is set to the high level. Both of the output signals $V_H$ and $V_L$ are set to the low level. The switch 45 is turned on by the high level of the output signal $V_M$. The read signal supplied to the equalizer 41 is, therefore, supplied as it is to the demodulator 47 without correcting the phase. As for the level Vi of the tangential skew signal, when $V_{TH2}<Vi$, each of the comparators 23 and 24 generates an output at the high level and the output signal $V_H$ is supplied as a high level signal to the switch 46. Both of the output signals $V_M$ and $V_L$ are set to the low level. The switch 46 is turned on by the high level of the output signal $V_H$. The read signal whose phase was corrected by the phase corrector 43 is supplied to the demodulator 47 and is demodulated as a reproduction signal.

In the construction of FIG. 11, although only the phase of the read signal is corrected by the equalizer 41, an amplitude corrector can be also included.

Figure 12:
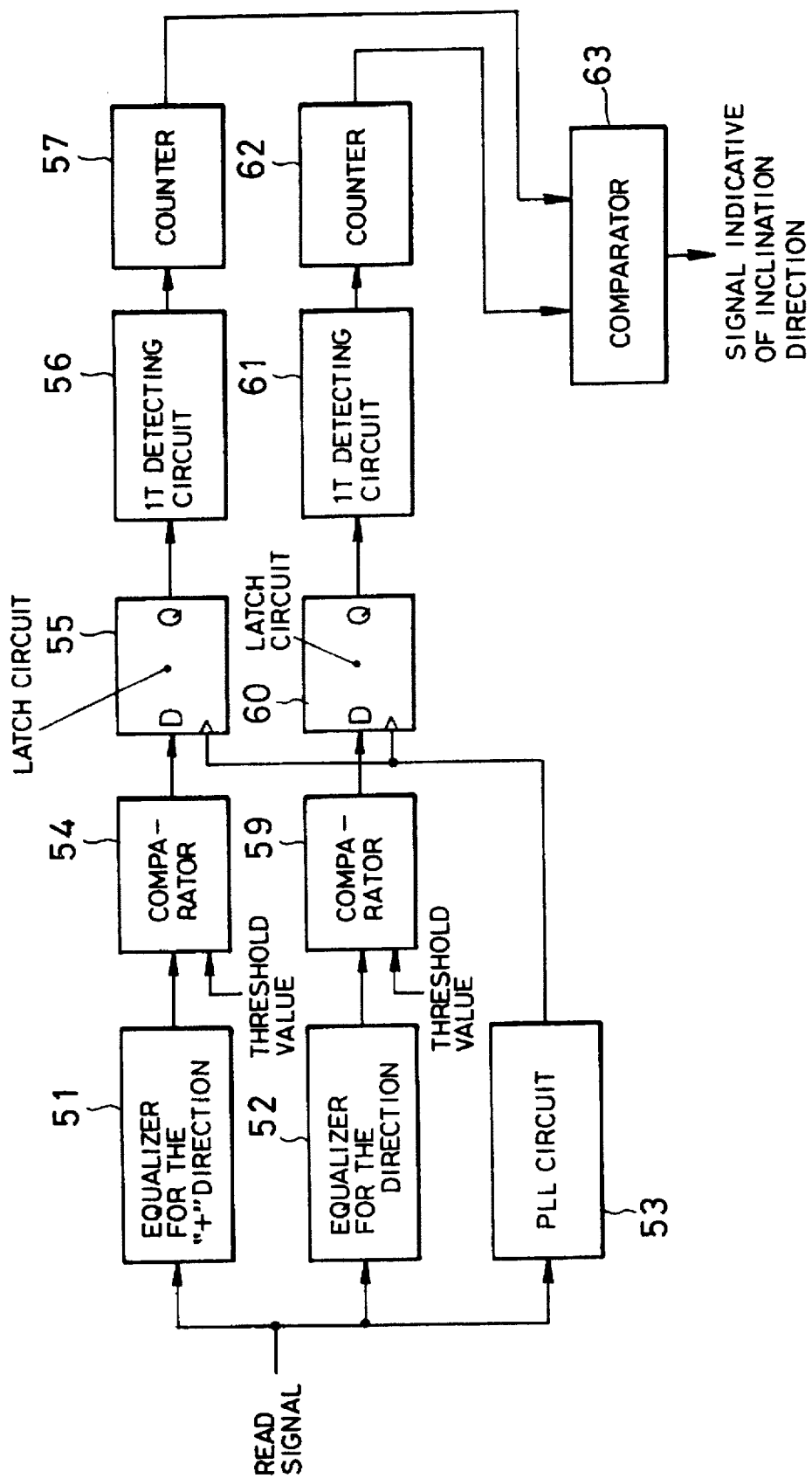
FIG. 12 is a block diagram showing another construction of a skew detector.

FIG. 12 shows a skew detector as another embodiment of the invention. In the skew detector, a read signal from the pickup is supplied through the RF amplifier. The read signal is supplied to an equalizer 51 for the "+" direction, an equalizer 52 for the "−" direction, and a PLL circuit 53, respectively. The equalizer 51 for the "+" direction has characteristics for correcting the phase of the read signal in the case where there is a skew in the "+" direction shown in FIG. 10. The equalizer 52 for the "−" direction has characteristics for correcting the phase of the read signal in the case where there is a skew in the "−" direction shown in FIG. 9. The PLL circuit 53 detects a clock signal whose period is set to 1T (unit pit interval) from the read signal. A comparator 54 is connected to an output of the equalizer 51 for the "+" direction. In order to binarize the read signal transmitted through the equalizer 51 for the "+" direction, the comparator 54 generates a high level output when the read signal level is equal to or larger than a threshold value. The comparator 54 generates a low level output when the level of the read signal is smaller than the threshold value. A latch circuit 55 comprising a D-type flip flop is connected to an output of the comparator 54 and holds and generates an output signal of the comparator 54 in accordance with a clock signal from the PLL circuit 53. A signal held by the latch circuit 55 is supplied to a 1T detecting circuit 56. The 1T detecting circuit 56 judges that when a signal of a code train indicative of "010" or "101" is supplied from the latch circuit 55 at a unit pit interval according to the clock signal from the PLL circuit 53, a signal indicative of 1T is supplied and generates a 1T detection pulse.

As a simple construction of the 1T detecting circuit 56, there is a circuit comprising a shift register of three bits for holding an output signal of the latch circuit 55 in accordance with the clock signal and a comparator for comparing the output held by the shift resistor and the signal of the foregoing code train.

A counter 57 is connected to an output of the 1T detecting circuit 56. The counter 57 counts the number of 1T detection pulse generated from the 1T detecting circuit 56.

In a manner similar to the equalizer 51 for the "+" direction, a construction comprising a comparator 59, a latch circuit 60, a 1T detecting circuit 61, and a counter 62 are connected to an output of the equalizer 52 for the "−" direction. The counters 57 and 62 are reset at a predetermined period.

The comparator 63 is connected to outputs of the counters 57 and 62 and judges which count value of the counter 57 or 62 is large or small. The output signal of the comparator 63 denotes a signal indicative of the skew direction.

When the digital data recorded on the optical disk 1 denotes, for example, a (1, 7) RLL code, the smallest inverting interval of pits and lands is equal to 2T and the largest inverting interval is set to 8T. On the optical disk 1, therefore, digital data has been recorded by using seven kinds of pits and lands of 2T to 8T. When the digital data recorded as mentioned above is read out, if a skew occurs between the disk 1 and the pickup 3, a high frequency component of the read signal is deteriorated. In case of the data (1, 7) RLL code, the highest frequency is equal to 1/2T. As shown in FIGS. 9 and 10, however, since the phase of the high frequency component is remarkably deviated, the high frequency component is often erroneously read out. A portion of the smallest inverting interval 2T is erroneously read out as 1T which cannot exist. The skew detector having the construction detects the direction of the skew by detecting the 1T.

In the skew detector, after the phase of the read signal from the pickup 3 was corrected by the equalizer 51 for the "+" direction, the signal is compared with the threshold value by the comparator 54. The equalizer 51 for the "+" direction compensates a phase distortion which occurs due to the skew in the "+" direction. A phase distortion occurring due to the skew in the "−" direction is not compensated but rather is emphasized by the equalizer 51. An output signal of the comparator 54 is held by the latch circuit 55 in accordance with the clock signal and the held output is supplied to the 1T detecting circuit 56. When one 1T is detected from the held output by the 1T detecting circuit 56, the counter 57 counts 1. In the portion constructed by the equalizer 51 for the "+" direction, comparator 54, latch circuit 55, 1T detecting circuit 56, and counter 57, since the phase distortion occurring due to the skew in the "+" direction is compensated by the equalizer 51 for the "+" direction, the number of generating times of 1T by the skew in the "−" direction within a predetermined period is counted. Similarly, in the portion constructed by the equalizer 52 for the "−" direction, comparator 59, latch circuit 60, 1T detecting circuit 61, and counter 62, since the phase distortion occurring due to the skew in the "−" direction is compensated by the equalizer 52 for the "−" direction, the number of generating times of 1T due to the skew of the "+" direction within a predetermined period is counted. The count values of the counters 57 and 62 are compared by the comparator 63. When the count value of the counter 57 is larger than that of the counter 62, an output signal of the comparator 63 becomes a signal indicative of the occurrence of the skew in the "−" direction. When the count value of the counter 57 is smaller than that of the counter 62, the output signal of the comparator 63 becomes a signal indicative of the occurrence of the skew in the "+" direction.

FIG. 13 shows an embodiment in which the skew detector in FIG. 12 is improved. In the diagram, the same portions are designated by the same reference numerals. In the skew detector, the read signal from the pickup is supplied to the equalizer 51 for the "+" direction, equalizer 52 for the "−" direction, PLL circuit 53, and a flat equalizer 65 through the RF amplifier. The flat equalizer 65 has flat phase characteristics. In a manner similar to the equalizers 51 and 52 for the "+" and "−" directions, a construction comprising a comparator 66, a latch circuit 67, a 1T detecting circuit 68, and a counter 69 is connected to an output of the flat equalizer 65. The counter 69 is reset together with the counters 57 and 62 at a predetermined period. The count values of the counters 57, 62, and 69 are compared by a comparator 70.

The comparator 70 generates a signal indicative of the skew direction in accordance with the magnitudes of the count values of the counters 57 and 62 and also generates a signal indicative of the magnitude of the skew from a difference between the count values of the counters 57 and 69 or a difference between the count values of the counters 62 and 69. Two signals which are generated from the comparator 70 are supplied as tangential skew signals to the coefficient setting circuit 15. The coefficient setting circuit 15 sets the coefficients $a_1$ and $a_2$ so as to correct a change amount of phase characteristics of the read signal in accordance with the output signals of the comparator 70. Since the phase characteristics of the equalizer 6 are, consequently, determined by the coefficient setting of the coefficient setting circuit 15, the phase of the read signal is compensated in the equalizer 6.

FIG. 14 further shows another embodiment of the invention. In the embodiment, the number of generating times of 1T due to the skew in the "+" direction in a predetermined period is counted by the portion comprising the equalizer 51 for the "+" direction, comparator 54, latch circuit 55, 1T detecting circuit 56, and counter 57. The number of generating times of 1T due to the skew in the "−" direction in a predetermined period is counted by the portion comprising the equalizer 52 for the "−" direction, comparator 59, latch circuit 60, 1T detecting circuit 61, and counter 62. The number of generating times of 1T of the read signal as it is from the pickup 3 in a predetermined period is counted by the portion comprising the flat equalizer 65, comparator 66, latch circuit 67, 1T detecting circuit 68, and counter 69. A comparator 71 is connected to the counters 57, 62, and 69. The comparator 71 detects the minimum value among the count values of the counters 57, 62, and 69 and generates a control signal indicative of the detection result. The control signal is supplied to a selector 72. The selector 72 relays and generates any one of output signals of the latch circuits 55, 60, and 67. Namely, when the count value of the counter 57 is the minimum value, the output signal of the latch circuit 55 is supplied to a demodulator (not shown) at the post stage. When the count value of the counter 62 is the minimum value, the output signal of the latch circuit 60 is supplied to the demodulator. When the count value of the counter 69 is the minimum value, the output signal of the latch circuit 67 is supplied to the demodulator.

As an equalizer, it is possible to use an equalizer for processing the analog signal from the pickup as it is or an equalizer for converting the analog signal to the digital signal and digitally processing it.

In the optical disk player of the present invention, the skew amount of the irradiated portion on the recording surface of the optical disk for the light beam irradiated onto the recording surface of the optical disk from the pickup means is detected and the transmitting characteristics of the read signal outputted from the pickup means is controlled in accordance with the skew amount detected, so that the waveform distortion of the read signal due to a warp or distortion existing in the track tangential direction of the optical disk can be compensated and the recording data can be accurately reproduced.

What is claimed is:

1. An optical disk player for reading and reproducing data recorded on an optical disk, comprising:

pickup means for irradiating a light beam onto a recording surface of said optical disk, for receiving light reflected from the recording surface, and for generating a read signal according to an amount of light received;

skew detecting means for detecting a skew amount of the light beam irradiated on the recording surface of said optical disk, wherein said skew detecting means comprises:

a photodetector having two split light receiving surfaces, each light receiving surface being divided in a direction of said optical disk and generating an output signal according to the amount of light received by all the divided surfaces, and means for calculating a difference between the output signals of the divided surfaces of said light receiving surfaces as a skew signal to generate a skew signal indicative of the skew amount; and equalizing means, responsive to said skew signal, for controlling transmitting characteristics of said read signal in accordance with said skew amount detected by said skew detecting means, wherein said equalizing means comprises:

comparing means for generating a first correction signal when said skew signal is equal to or less than a first reference value, for generating a correction stop signal when said skew signal is larger than said first reference value and equal to or less than a second reference value greater than said first reference value, and for generating a second correction signal when said skew signal is larger than said second reference value, a first phase corrector for correcting a phase of said read signal in accordance with said first correction signal, a second phase corrector for correcting the phase of said read signal in accordance with said second correction signal on the basis of characteristics opposite to those in the phase correction of said first phase corrector, and means for relaying and generating said read signal in accordance with said correction stop signal.

2. A player as claimed in claim 1, wherein said skew detecting means detects the skew amount in the track tangential direction of said recording surface.

3. A player as claimed in claim 1, wherein at least one of phase characteristics and amplitude characteristics of said equalizing means are variable.

4. An optical disk player for reading and reproducing data recorded on an optical disk, comprising:

pickup means for irradiating a light beam onto a recording surface of said optical disk, for receiving light reflected from the recording surface, and for generating a read signal according to an amount of received reflected light;

skew detecting means for detecting a skew amount of the light beam irradiated on the recording surface of said optical disk, wherein said skew detecting means comprises:

a first equalizer receiving said read signal and having first phase correcting characteristics, first binarizing means for binarizing an output signal of said first equalizer by a predetermined threshold value at a unit bit interval in accordance with a clock signal derived from said read signal, means for generating a first detection pulse when an inverting interval smaller than a minimum inverting interval is detected from a code train of an output signal of said first binarizing means, a first counter for counting the number of said first detection pulses generated, a second equalizer receiving said read signal and having second phase correcting characteristics opposite to said first phase correcting characteristics, second binarizing means for binarizing an output signal of said second equalizer by a predetermined threshold value at a unit bit interval in accordance with the clock signal derived from said read signal;

means for generating a second detection pulse when an inverting interval smaller than the minimum inverting interval is detected from a code train of an output signal of said second binarizing means, a second counter for counting the number of said second detection pulses, and comparing means for comparing the count values of said first and second counters and for generating a comparison result signal indicative of a skew direction; and equalizing means for controlling transmitting characteristics of said read signal in accordance with said skew amount detected by said skew detecting means.

5. An optical disk player as claimed in claim 4, wherein said skew detecting means further comprises:

a third equalizer receiving said read signal and having flat phase characteristics, third binarizing means for binarizing an output signal of said third equalizer by a predetermined threshold value at a unit bit interval in accordance with the clock signal derived from said read signal, means for generating a third detection pulse when an inverting interval smaller than the minimum inverting interval is detected from a code train of an output signal of said third binarizing means, and a third counter for counting the number of said third detection pulses generated, wherein said comparing means compares the count values of said first, second, and third counters and generates a comparison result signal indicative of a skew direction and the skew amount; and equalizing means for controlling transmitting characteristics of said read signal in accordance with said skew amount detected by said skew detecting means.

* * * * *